H. R. BRUAH.
PROPELLER SHAFT CONNECTION.
APPLICATION FILED APR. 21, 1917.
1,243,805.
Patented Oct. 23, 1917.
2 SHEETS—SHEET 2.
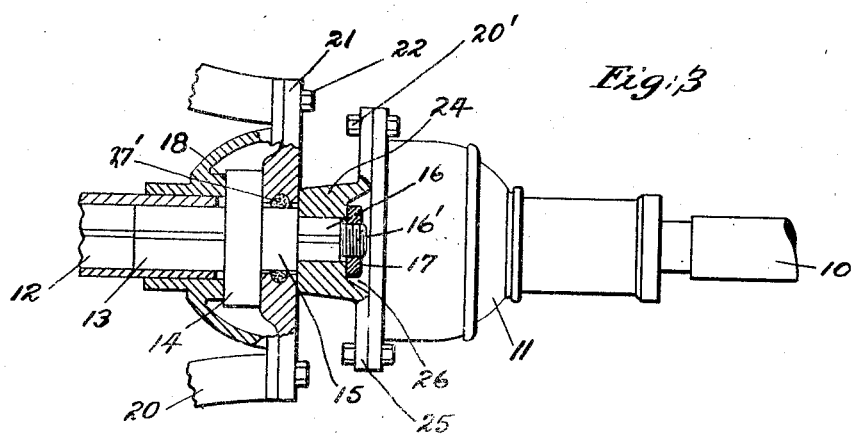
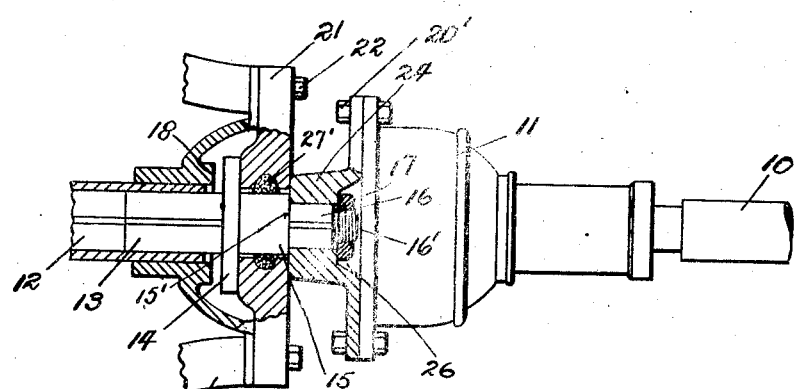
Inventor
Howard R. Bruah.
By Albert C. Bell
Attorney

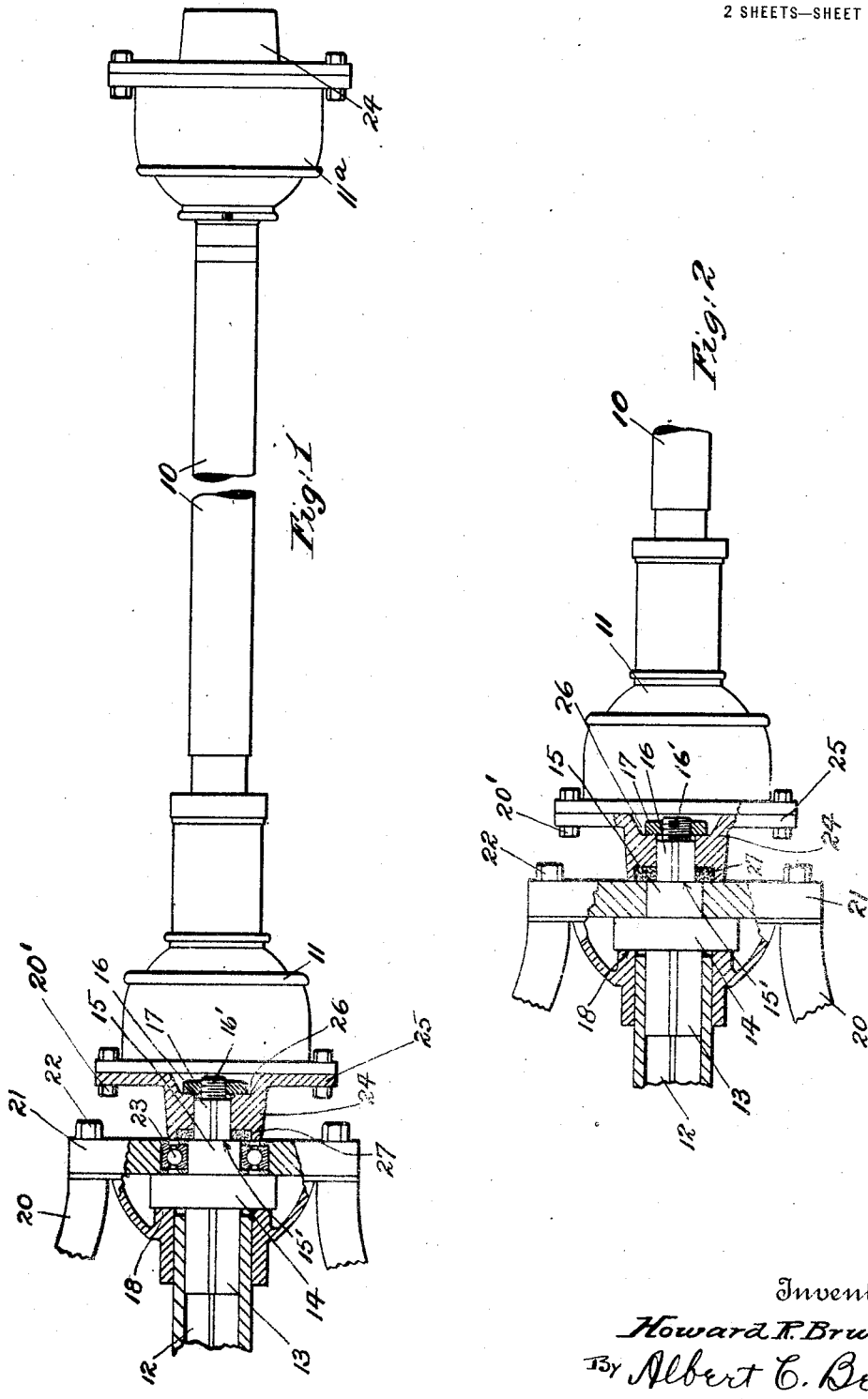

UNITED STATES PATENT OFFICE.

HOWARD R. BRUAH, OF CHICAGO, ILLINOIS, ASSIGNOR TO MOTOR DEVELOPMENT COMPANY, OF CHICAGO, ILLINOIS, A CORPORATION OF ILLINOIS.

PROPELLER-SHAFT CONNECTION.

1,243,805.

Specification of Letters Patent. Patented Oct. 23, 1917.

Application filed April 21, 1917. Serial No. 163,574.

*To all whom it may concern:*

Be it known that I, HOWARD R. BRUAH, a citizen of the United States, residing at Chicago, in the county of Cook and State of Illinois, have invented a certain new and useful Improved Propeller-Shaft Connection, of which the following is a specification.

The principal object of the present invention may be said to reside in the providing of a connection for propeller shafts equipped with universal joints characterized by simplicity, efficiency, cheapness of manufacture and adaptability for connection with standard forms of universal joints without change or alteration thereof and further characterized by the fact that it may be connected between the transmission shaft of an internal combustion engine and the universal joint of a propeller shaft in a brief period of time by unskilled labor. Other and further objects of the present invention reside in the providing of general details of construction and arrangement and combination of parts as will hereinafter more fully appear.

The invention consists of the improvements hereinafter described and finally claimed.

The nature, characteristic features and scope of the invention will be more fully understood from the following description taken in connection with the accompanying drawings forming part hereof and in which:

Figure 1 is a view in plan, partly sectioned, of a propeller shaft and motor transmission shaft as coupled together in accordance with the connection embodying the invention.

Fig. 2 is a fragmentary view of a slightly modified form.

Fig. 3 is a similar view of a further modified form, and

Fig. 4 is a similar view of a still further modified form.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

For illustrative purposes the drawings disclose a connection as used in conjunction with the transmission shaft of motor vehicles and the propeller shaft thereof and the following description will be restricted thereto although obviously the connection of the invention may be otherwise employed.

In the drawings 10 designates a propeller shaft of standard make as employed in motor vehicle constructions, provided at each end with a universal joint, the same being designated 11 and 11$^a$. 12 designates the transmission shaft of the power plant of a motor vehicle also of standard make. Between the universal joint 11 and the free end of the motor transmission shaft 12 is positioned the connection of the present invention and in this respect it is to be observed that neither the transmission shaft nor universal joint construction is altered in effecting the coupling thereof.

Referring now more particularly to Fig. 1, the connection of the invention embraces a stud-shaft, one end of which is adapted for engaging within the recessed end of the transmission shaft 12 in a manner so as to be rotative therewith. For illustrative purposes, the transmission shaft interior is squared and the stud-shaft is squared to fit snugly therein. Obviously other methods of construction may be employed. This squared part 13 of the stud-shaft has preferably formed integral therewith a collar 14, an annular member 15 to form a journal and a portion 16 terminating in an extension 16'. The collar 14 is adapted for abutting relation with the end portion 18 of the ball-cup bearing of the power plant and is maintained in this position by means of a disk-like bearing plate 21 centrally apertured, and which is bolted as at 22 to the fixed frame 20 of the power plant. An antifriction bearing 23 is positioned within the apertured portion of said plate and the journal 15 projects through and is rotatable within said anti-friction bearing. The portion 16 of the stud-shaft engages within the recessed interior of the projection 24 of the plate 25 of the universal joint 11 so as to be rotatable therewith. The parts are usually squared although other forms of connection may be employed. To clamp the transmission shaft and universal joint 11 together so as to be rotatable in unison, a nut 17 is screwed to place upon the threaded extension 16′ of the stud-shaft which nut abuts against the recessed portion 26 of plate 25. However, connections other than a nut may be employed. Thus positioned, the anti-friction bearing 23 is in abutting relation between the collar 14 and the free end of the projection 24 of plate 25. The stud-shaft as a whole is interlocked against endwise movement, as is the universal joint 11, because the collar 14 is held against one side of the bearing plate 21 and the projection 24 is held against the other side. That part of projection 24 which abuts against the anti-friction bearing may be recessed and packed as at 27 with felt or the like to prevent the escape of lubricant from the power plant. In the construction just described it is to be noted that the journal 15 of the stud-shaft is rotatable in the fixed bearing plate 21 and that the projection 24 of the universal joint 11 abuts against the said bearing plate 21 and is separated by the packing 27 from the flanged portion 15′ of said journal. It is by such construction that I am enabled to accomplish an efficient coupling without alteration of the universal joint. Plate 25 and projection 24 of the universal joint, as manufactured, are drop forged and the projection 24 resulting is slightly tapered as shown. I have discovered that to extend this projection within the aperture of the bearing plate 21 for rotation within the bearing plate 21 as a journal, although practised and which forms no part of my invention, is unsatisfactory for the reason that the taper of the projection 24 must be manufactured of special length to provide clearance between the heads of bolts 22 and 20′ and must also be machined to eliminate the taper so that an ordinary universal joint plate and projection cannot be utilized.

In Fig. 2, the construction is the same as that shown in Fig. 1 except that the anti-friction bearing is omitted and the bearing plate bears directly upon the journal 15.

In Fig. 3, the packing 27 is omitted from the projection 24, the bearing plate is packed as at 27′ and said bearing plate is extended to bear directly upon the journal 15.

In Fig. 4, the collar 14 is made much thinner than in the foregoing figures so that it does not bind against the end 18 of ball-cup bearing.

In all of the above instances, the stud-shaft and universal joint are interlocked against endwise movement and the stud-shaft may be easily positioned between an ordinary universal joint and a motor transmission shaft without alteration of said standard parts, such for instance, as a special flange for the universal joint as above described.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. A connection of the character stated comprising in combination a motor transmission shaft, a propeller shaft provided with a universal joint, a stud-shaft having a member constituting a journal connecting the two shafts for rotation in unison, a fixed bearing plate in which said journal rotates and means for preventing endwise movement of the stud-shaft and universal joint.

2. A connection of the character stated comprising in combination a motor transmission shaft, a propeller shaft provided with a universal joint, a stud-shaft having a collar and a member constituting a journal connecting said shafts for rotation in unison, a fixed bearing plate against which said collar abuts upon one side and in which said journal rotates, the free end of the universal joint abutting against the opposite side of said bearing plate, and means for preventing endwise movement of said stud-shaft and universal joint.

3. A connection of the character stated comprising in combination, a motor transmission shaft, a propeller shaft provided with a universal joint having an extension, a stud-shaft having a collar and a member constituting a journal connecting the transmission shaft and universal joint extension for rotation in unison, a fixed bearing plate against which said collar abuts upon one side and against which said extension abuts upon the other side, said journal being rotative in said bearing plate, and means cooperatively engaging the stud-shaft and said extension for preventing endwise movement of said stud-shaft and universal joint.

4. A stud-shaft of the character stated embracing a portion shaped and proportioned at one end to engage with a transmission shaft and proportioned and shaped at its opposite end to engage with a propeller shaft the intermediate portion of the stud-shaft being provided with a collar and a member constituting a journal and means at the propeller shaft engaging end of the stud-shaft for interlocking the stud-shaft with respect to a propeller shaft.

In testimony whereof, I have hereunto signed my name, this fourth day of April, A. D. 1917.

HOWARD R. BRUAH.

Copies of this patent may be obtained for five cents each, by addressing the "Commissioner of Patents, Washington, D. C."